Patented Feb. 1, 1927.

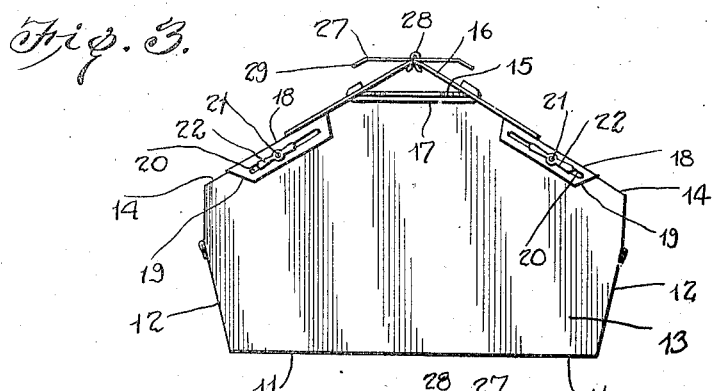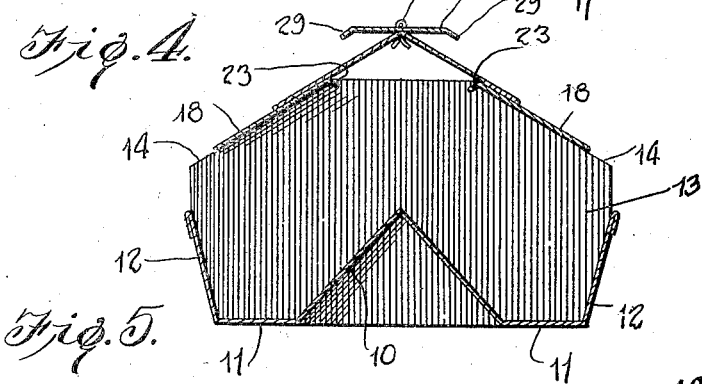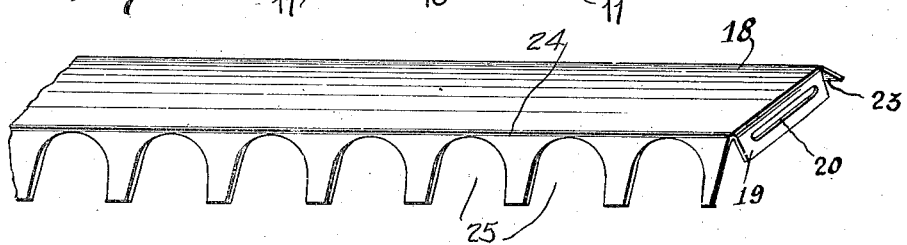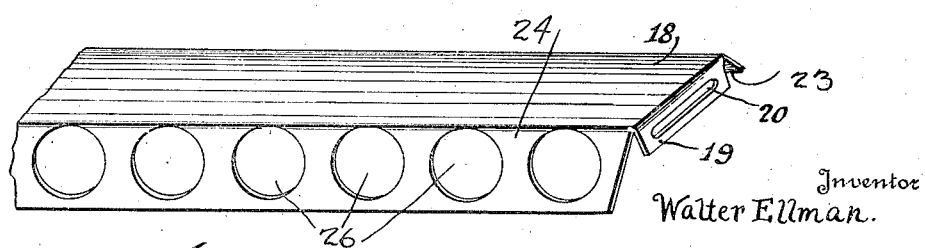

1,616,118

UNITED STATES PATENT OFFICE.

WALTER ELLMAN, OF NORTH BRANCH, NEW YORK.

CHICK FEEDER.

Application filed May 28, 1926. Serial No. 112,347.

This invention relates to animal husbandry and has special reference to a chick feeder.

More particularly the invention relates to improvements in the feeder shown and described in my prior Patent No. 1,576,419, issued December 29, 1925.

One important object of the invention is to improve the general construction of devices of this character.

A second important object of the invention is to provide a device of this description having novel means to regulate the size of the feed openings so that the chicks may not climb or fall into the food in the feeder and drown, the feeder being intended for liquid feed such as sour milk feed although it may also be used for solid feed.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a top plan view of the feeder.

Figure 2 is a side elevation thereof.

Figure 3 is an end elevation thereof.

Figure 4 is a section on the line 4—4 of Figure 1.

Figure 5 is a detail showing a modified form of guard plate.

Figure 6 is a detail of a second modification of the guard plate.

In the present embodiment the feeder is provided with a bottom having a central V-shaped portion 10 running from end to end of the feeder and from the lateral edges of this portion extend narrow horizontal base portions 11. The outer edge of each base portion is provided with an upwardly and outwardly extending flange 12 forming one of the sides of the feeder. At each end of the feeder is an end plate 13 having a horizontal bottom edge and lower side edges conforming to the inclination of the feeder sides. The upper side edges of these end plates are vertical as at 13 and from the tops of these portions extend inclined top edges 14 connected at the top by a horizontal top edge portion provided with an outwardly extending flange 15. The feeder thus forms a double trough.

On the upper portions of these edges 14 rest the side portions of a V-shaped fixed top 16 which is held in position by wires 17 passing beneath the flanges 15 and having their ends extending through the top and bent over as shown. The portions of the top close to its lateral edges are free from the end plates and resting on edges 14 of the end plates are gauge plates 18 which slide beneath the free edge portions of the top and have at each end a downwardly extending flange 19 which laps over the respective end plate. Each of these flanges is provided with a slot 20 through which passes a bolt 21 carrying a butterfly nut 22 by which the respective gauge plates may be secured in adjusted position. The inner edge of each gauge plate is stiffened by a downwardly extending flange 23 and the outer edge may either be plain or may be provided with a downwardly extending flange 24 having notches 25 in its lower edge as in Figure 5 or openings 26 as in Figure 6. These gauge plates are adjustable so that the size of the feed opening or openings may be made to suit the size of the chicks and thus the larger fowl prevented from robbing the feeder.

Running longitudinally of the ridge of the top is a guard plate 27 which is secured to the top by fasteners 28 in such manner that it is normally held in a horizontal position but is freely tiltable laterally. This plate preferably has down turned side edges 29. When a fowl lights on the plate which is of proper width for the purpose, it cannot grasp the plate with its feet and, the plate tilting, the fowl slips off. This prevents roosting of fowl on the feeder.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A chick feeder having a trough like body provided with ends having top edges inclined upwardly toward the center, a V-shaped top resting on the upper parts of said inclined top edges and having its edge portions free from said inclined edge, gauge plates resting on said inclined edges and adjustably slidable beneath the free portions of the top, and means to secure the gauge plates in adjusted position.

2. A chick feeder having a trough like body provided with ends having top edges inclined upwardly toward the center, a V-shaped top resting on the upper parts of said inclined top edges and having its edge portions free from said inclined edge, gauge plates resting on said inclined edges and adjustably slidable beneath the free portions of the top, down turned flanges at the ends of the gauge plates lapping over the ends and each provided with a slot, bolts carried by said ends and extending through said slots, and clamping nuts on said bolts.

In testimony whereof I affix my signature.

WALTER ELLMAN.